(12) United States Patent
Homme et al.

(10) Patent No.: US 8,134,601 B2
(45) Date of Patent: Mar. 13, 2012

(54) LENS BARREL HAVING CAMERA SHAKE CORRECTOR AND PHOTOGRAPHING APPARATUS EQUIPPED THEREWITH

(75) Inventors: Shigeo Homme, Hachioji (JP); Akira Funahashi, Mitaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 356 days.

(21) Appl. No.: 12/417,440

(22) Filed: Apr. 2, 2009

(65) Prior Publication Data

US 2009/0251552 A1    Oct. 8, 2009

(30) Foreign Application Priority Data

Apr. 7, 2008    (JP) .................. 2008-099462

(51) Int. Cl.
  *H04N 5/228*  (2006.01)
  *G03B 17/00*  (2006.01)
(52) U.S. Cl. ...................... 348/208.1; 396/52

(58) Field of Classification Search .. 348/208.1–208.11; 396/52–55
See application file for complete search history.

(56) References Cited

U.S. PATENT DOCUMENTS

| | | | | |
|---|---|---|---|---|
| 6,225,614 | B1 * | 5/2001 | Ono | 250/201.5 |
| 7,653,295 | B2 * | 1/2010 | Yumiki et al. | 396/55 |
| 2007/0036534 | A1 * | 2/2007 | Sasaki | 396/85 |
| 2009/0128640 | A1 * | 5/2009 | Yumiki | 348/208.6 |

* cited by examiner

*Primary Examiner* — Trung Diep
(74) *Attorney, Agent, or Firm* — Cozen O'Connor

(57) ABSTRACT

A camera shake corrector includes: a first moving member that holds an image sensor or a prescribed lens and is capable of moving in a first direction; a first motor that moves the first moving member; a second moving member that holds the first moving member and is capable of moving in a second direction that is different from the first direction; a second motor that moves a second moving member; a single detecting member; and a section to be detected by the single detecting member, which is formed on the first moving member. Initial positions of the first moving member and the second moving member are detected by the section to be detected and the single detecting member.

5 Claims, 14 Drawing Sheets

LENS BARREL HAVING CAMERA SHAKE CORRECTOR AND PHOTOGRAPHING APPARATUS EQUIPPED THEREWITH

BACKGROUND OF THE INVENTION

The present invention relates to a camera shake corrector, a lens barrel and to a photographing apparatus.

An active camera shake correcting technology that corrects deviation of an optical axis caused by camera shake and thereby obtains clear images has been put into practical use. This active camera shake correcting technology includes generally a type wherein a part of a photographic optical system is moved and a type wherein an image sensor is moved.

As a camera shake corrector of this kind, there is known a corrector to conduct camera shake correction by constituting the first moving member on which an image sensor is mounted together and the second moving member that holds the first moving member so that both members may be moved in the direction to go straight by two stepping motors each representing an actuator (see, for example, Japanese Unexamined Patent Application Publication No. 2007-206553).

In the conventional camera shake corrector, a shading section is formed independently on each of the first and second moving members for the purpose of detecting respective initial positions for the first and second moving members, and two photo-interrupters corresponding to the shading sections are provided. For this reason, an area for the two shading sections to move and a large space for fixing two photo-interrupters are needed in the periphery of an image sensor or a lens to be moved for camera shake correction, which results in a problem of a trend for a large size.

SUMMARY OF THE INVENTION

In view of the problems mentioned above, an object of the invention is to obtain a small-sized camera shake corrector and thereby to obtain a small-sized photographic apparatus equipped with a lens-barrel having a camera shake correcting function.

The object mentioned above is attained by the aspects described below.

Aspect (1): A camera shake corrector having therein a first moving member that holds an image sensor or a prescribed lens and is made to be capable of moving in the first direction, a first motor for moving the first moving member, a second moving member that holds the first moving member and is made to be capable of moving in the second direction that is different from the first direction, a second motor for moving a second moving member and only a detecting member, wherein a section to be detected by the detecting member is formed on the first moving member, and initial positions of the first moving member and the second moving member are detected by the section to be detected formed on the first moving member and by the aforesaid detecting member.

Aspect (2): A lens barrel that is characterized to be equipped with the camera shake corrector described in the aforesaid aspect (1).

Aspect (3): A photographic apparatus that is characterized to be equipped with the lens-barrel described in the aforesaid aspect (2).

BRIEF DESCRIPTION OF THE DRAWINGS

Each of FIG. 1(a)

Each of FIG. 5(a)

DETAILED DESCRIPTION OF THE PREFERRED EMBODIMENT

The invention will be explained in detail as follows referring to the embodiment to which, however, the invention is not limited.

Figure 1:
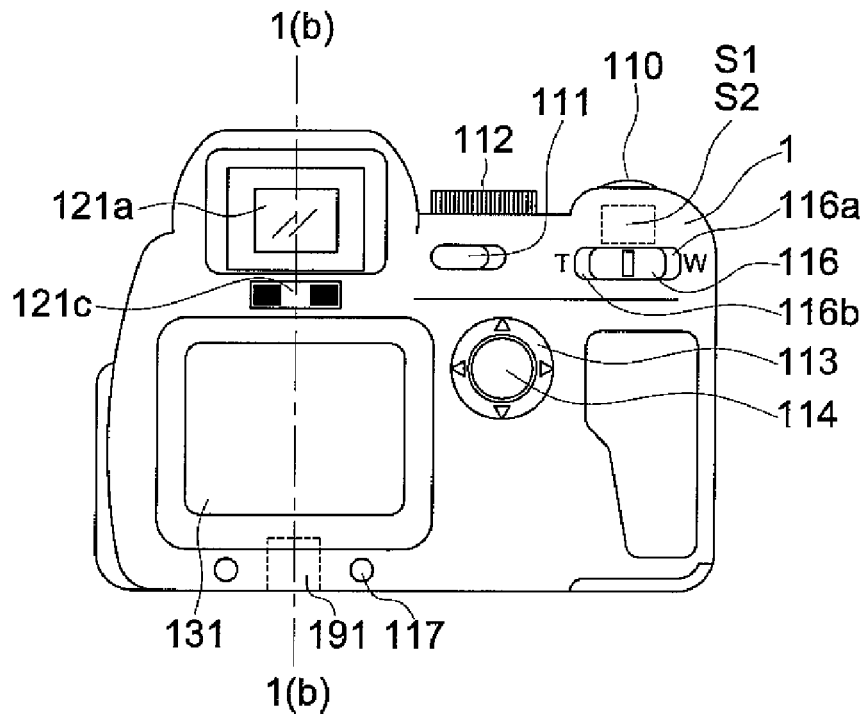
FIG. 1(b) is a schematic diagram of a digital camera that is an example of an photographic apparatus relating to the embodiment of the invention.
Figure 1:
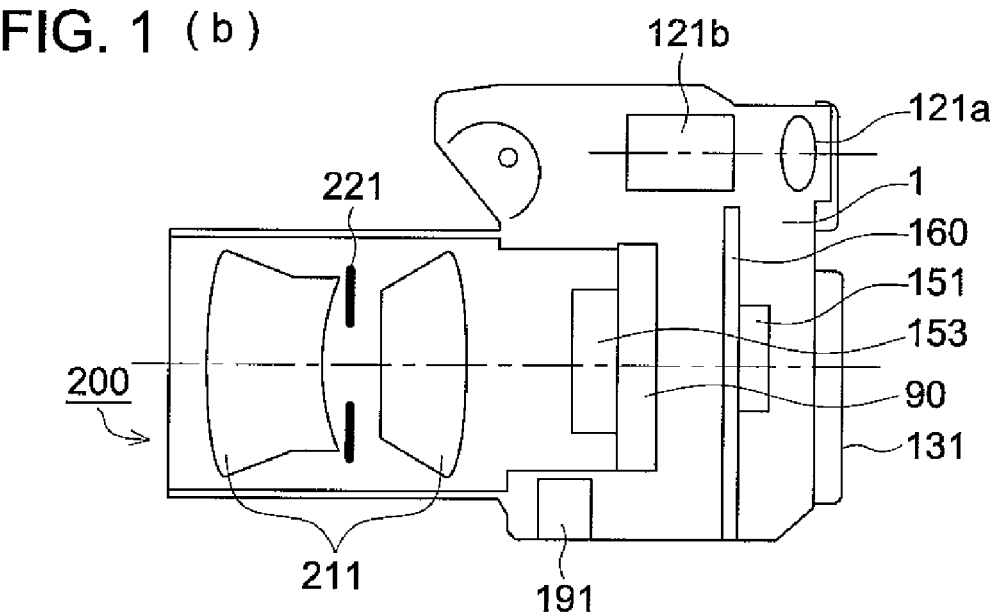

Each of FIG. 1(a) and FIG. 1(b) is a schematic diagram of digital camera 1 that is an example of a photographic apparatus relating to the embodiment of the invention. FIG. 1(a) is an appearance pattern diagram on the rear side of digital camera 1 and FIG. 1(b) is a longitudinal sectional pattern diagram on 1(b)-1(b) of FIG. 1(a).

As is shown in FIG. 1(a), release button 110 is provided on a top surface of digital camera 1. Further, on the release button 110, there is provided a two-step switch including release switch S1 that is turned on with halfway pressing and release switch S2 that is turned on with complete pressing, and the release button 110 is made to operate through the first step of pressing down and the second step of pressing down. In the same way, on a top surface of digital camera 1, there is provided mode setting dial 112 that establishes an operation mode of the camera. Operation mode of the camera includes "a photographing mode", "a sound recording mode" that records sounds, "a reproduction mode" that reproduces images and sounds and "setting mode" that conducts various setting types.

On the rear side of digital camera 1, there are provided rear monitor 131 composed of a liquid crystal, eyepiece section 121a of electronic viewfinder (EVF) 121 and eyepiece viewing detector 121c that is arranged in the vicinity of the eyepiece section 121a and detects that a photographer looks into the eyepiece section 121a. The eyepiece viewing detector 121c is arranged to detect that a photographer looks into the eyepiece section 121a, by emitting invisible light such as infrared radiation from a light emitting section, for example, and by receiving reflected light of emitted infrared rays coming from a face of the photographer, with a light receiving element mounted on a light receiving section that is away by a base line length.

On the rear side of digital camera 1, there are arranged respective operation sections such as main switch 111 that is a power source switch for the camera, jog dial 113 having switches in four directions from side to side and up and down, determination switch 114 that is arranged at the center of the jog dial 113 and determines setting by the jog dial 113, zoom switch 116 that conducts zooming for a photographing optical system and rear monitor setting switch 117 that establishes ON and OFF of rear monitor 131.

For example, for setting to conduct camera shake correction, the rear monitor 131 is caused to display a menu, the jog dial 113 is caused to select and the determination switch 114 is caused to determine.

On the bottom face of the digital camera 1, there is provided tripod socket hole 191 in which a female screw through which a camera is mounted on a tripod is cut.

Further, on a longitudinal cross section including an optical axis of photographing optical system 211 shown in FIG. 1(b), a beam of light coming from a photographic object which has passed through photographing optical system 211 and stop and shutter unit 221 forms an image on image sensor 153, and is converted into electric signals by image sensor 153, and is converted into image data by image processing section 151 on main substrate 160. The image data are displayed either on EVF display element 121b of electronic viewfinder (EVF) 121 or on rear monitor 131 depending on setting of rear monitor setting switch 117.

On the rear surface side of image sensor 153, there is incorporated camera shake corrector 90, so that camera shake correction may be carried out by moving image sensor 153 in a plane perpendicular to an optical axis of photographing optical system 211.

Figure 2:
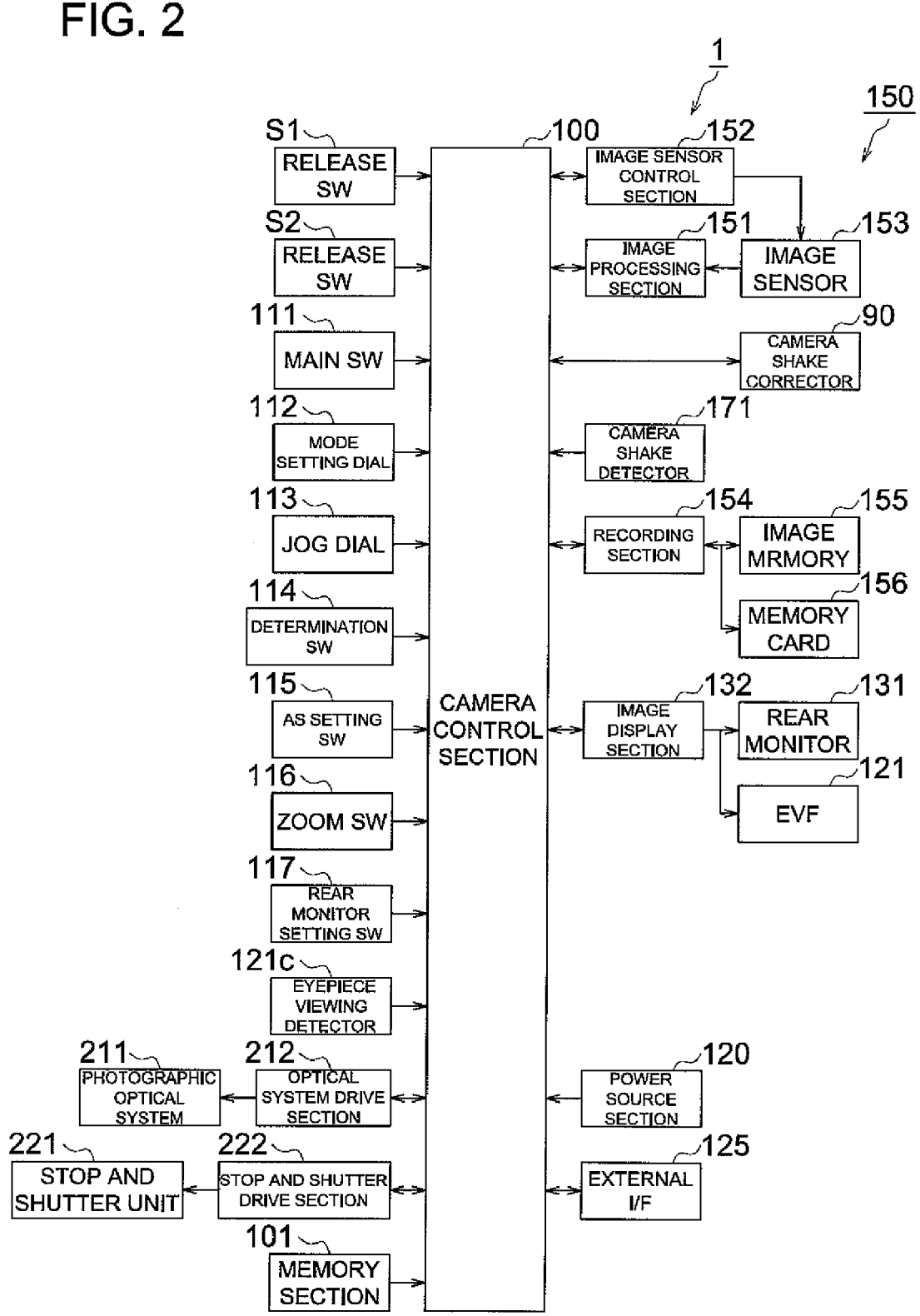
FIG. 2 is a block diagram of a digital camera that is an example of a photographic apparatus relating to the embodiment of the invention.

FIG. 2 is a block diagram of digital camera 1 that is an example of a photographic apparatus relating to the embodiment of the invention.

Camera control section 100 that is a control section of digital camera 1 is composed of an unillustrated CPU (Central Processing Unit) and a work memory, and reads out a program stored in memory section 101 on the work memory, to control concentrically various portions of digital camera 1 according to the program stored in memory section 101.

Further, the camera control section 100 receives input from main switch 111, mode setting dial 112, jog dial 113, determination switch 114, AS setting switch 115, zoom switch 116, rear monitor setting switch 117, release switch S1, release switch S2 and eyepiece viewing detector 121c, to control overall digital camera 1, and supplies power source to various sections of the camera by controlling power source section 120, and conducts a correspondence including transmission of image data with a personal computer and a printer through outer interface (I/F) such as USB (Universal Serial Bus).

Furthermore, the camera control section 100 controls image sensing operations of image sensor 153 through image sensor control section, then, processes images taken by image sensor 153 through image processing section 151, and records them temporarily on image memory 155 through recording section 154, to record them finally on memory card 156. The image processing section 151, the image sensor control section 152 and the image sensor 153 are named generically as photographic section 150. The camera control section 100 further controls AF operations (auto-focus operations) of photographic optical section 211 through optical system drive section 212, based on focusing information and exposure information obtained from image output of the photographic section 150, and controls stop and shutter unit 221 through stop and shutter drive section 222.

In addition, the camera control section 100 displays live views of images taken by image sensor 153 on electronic view finder (EVF) 121 or on rear monitor 131 or on both of them through image display section 132 in accordance with setting of rear monitor setting switch, then, displays images recorded on image memory 155 on rear monitor 131 as an after-view, and displays images recorded on memory card 156 on rear monitor 131 as reproduction images.

Further, when camera shake correction is established, the camera control section 100 drives camera shake corrector 90 based on camera shake information detected by camera shake detector 171 in the case of photographing, to correct camera shake.

Figure 3:
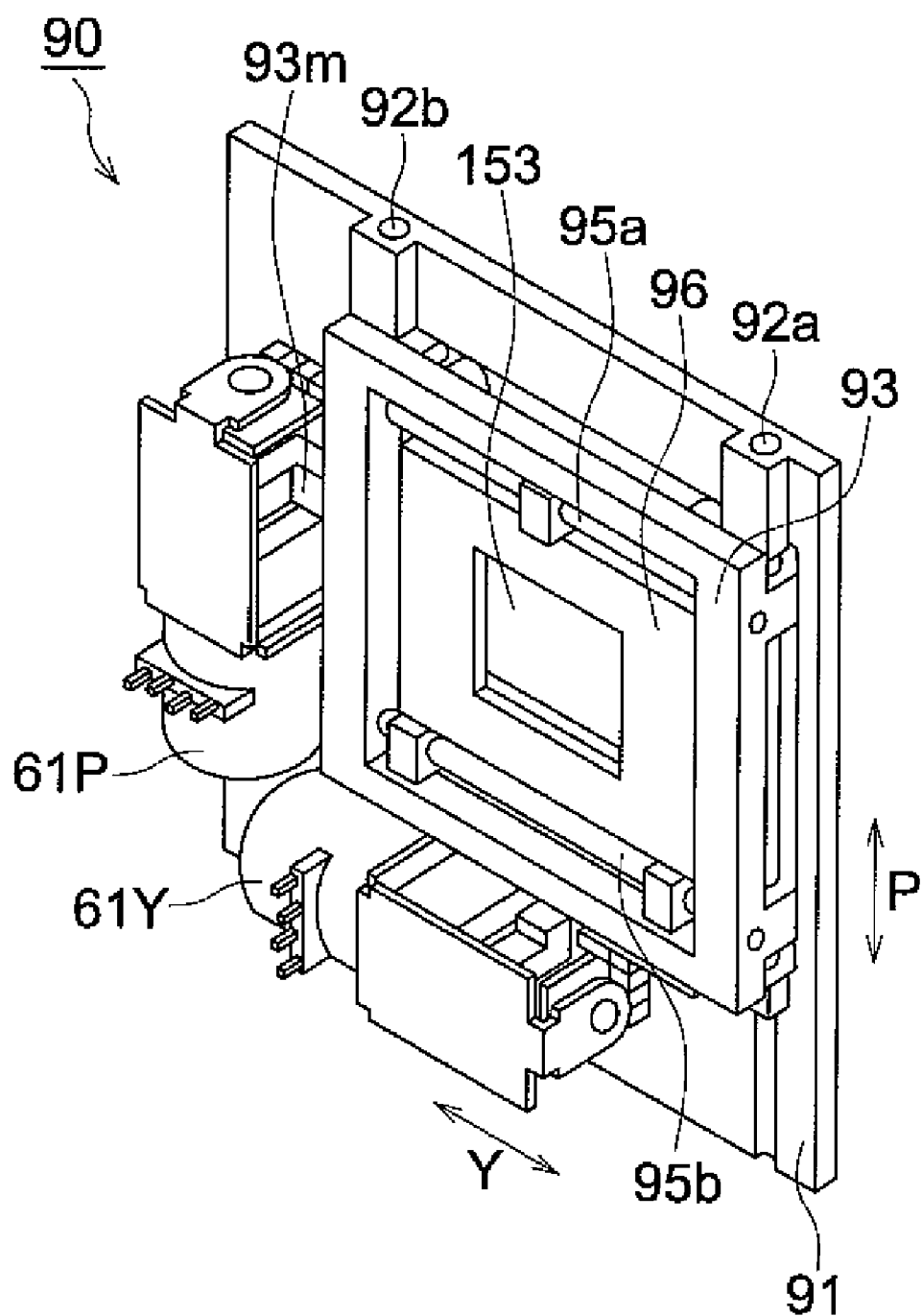
FIG. 3 is a perspective view showing a camera shake corrector relating to the embodiment of the invention.
Figure 4:
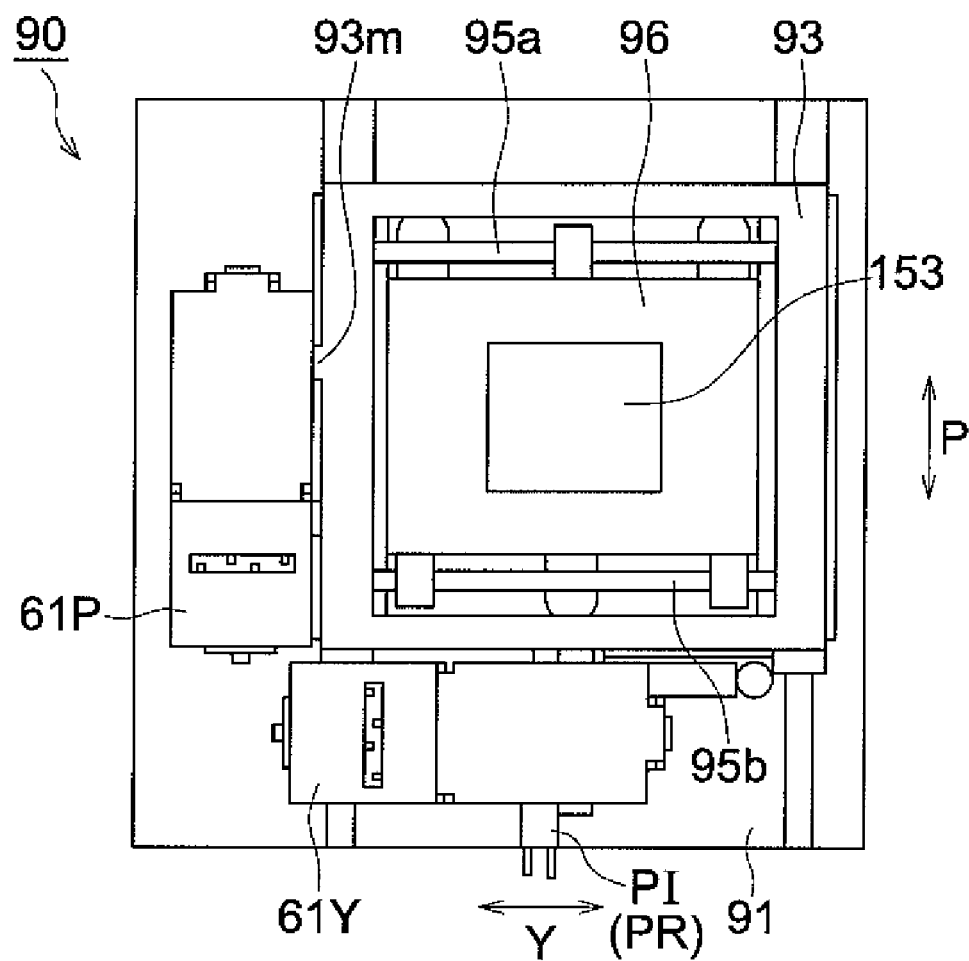
FIG. 4 is a plan view showing a camera shake corrector relating to the embodiment of the invention.

FIG. 3 is a perspective view showing camera shake corrector 90 relating to the embodiment of the invention. FIG. 4 is a plan view showing camera shake corrector 90 relating to the embodiment of the invention.

In the camera shake corrector 90 shown in FIGS. 3 and 4, first moving member 96 holds image sensor 153. Meanwhile, an infrared blocking filter or an optical low-pass filter may also be held in front of image sensor 153.

On second moving member 93, there are fixed two guide shafts 95a and 95b each representing a guide member, and first moving member 96 is arranged to be guided by guide shafts 95a and 95b to be capable of moving in the direction of illustrated arrow Y. Namely, the second moving member 93 holds the first moving member 96.

On base plate 91, there are fixed two guide shafts 92a and 92b each representing a guide member, and second moving member 93 is guided by guide shafts 92a and 92b to be capable of moving in the direction of illustrated arrow P.

Each of FIG. 5(a) and FIG. 5(b) is a cross-sectional view of camera shake corrector 90 shown in each of FIG. 3 and FIG. 4 that is cut on a plane passing through center axes of the guide shafts 95a and 95b. To avoid overlapping of explanations, members in FIGS. 5(a) and 5(b) which are the same as those in the camera shake corrector shown in each of FIG. 3 and FIG. 4 are given the same symbols as in the FIGS. 3 and 4, for the explanation.

As shown in FIG. 5(a), on the first moving member 96, shading sections 96s representing detected portions which are inserted in or dismounted from light emitting and receiving section of photo-interrupter PI representing a detecting member are formed integrally on arm portion 96m and on a tip of the arm portion 96m. Further, as shown in FIG. 5(b), when photo-reflector PR is used as a detecting member, reflecting sections 96r representing detected portions facing photo-reflector PR representing a detecting member are formed on arm portion 96*m* and on a tip of the arm portion 96*m* integrally on the first moving member 96. The arm portion 96*m* is urged by spring 73, and is in contact with nut 72 (first female screw member) representing the first female screw member that engages with lead screw 71 representing the first male screw member that is rotated by stepping motor 61Y that is a first motor.

Further, arm portion 93*m* is formed integrally on the second moving member 93. The arm portion 93*m* is urged by spring 77, and is in contact with nut 76 representing the second female screw member that engages with lead screw 75 that is the second male screw member rotated by stepping motor 61P serving as the second motor.

Owing to this, stepping motor 61Y is driven to move the first moving member 96 along guide shafts 95*a* and 95*b* and stepping motor 61Y is driven to move the second moving member 93 along guide shafts 92*a* and 92*b*, whereby, image sensor 153 can be moved in a plane that is perpendicular to optical axis OB of the photographic optical system.

Figure 5:
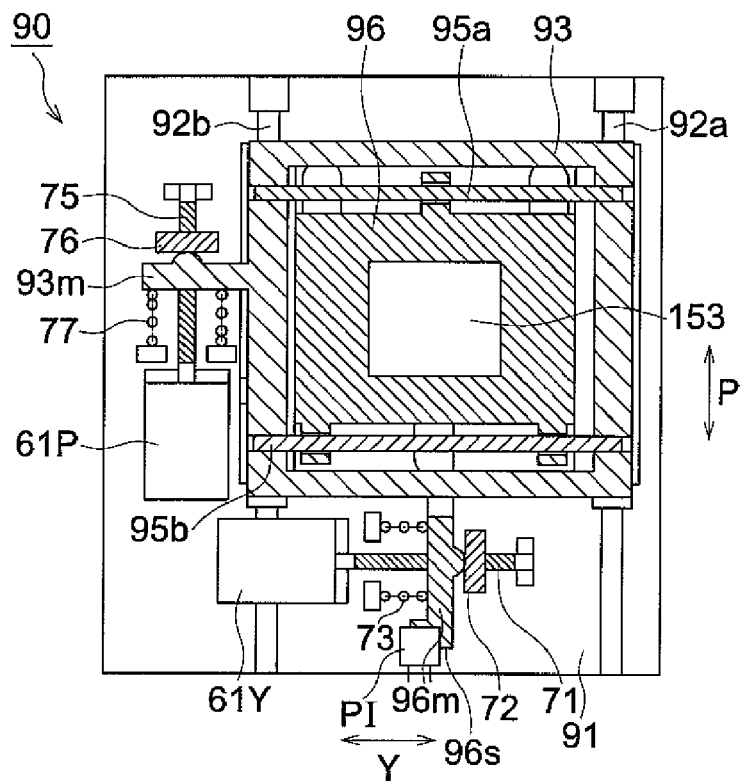
FIG. 5(b) shows a camera shake corrector employing respectively a photo-interrupter and a photo-reflector as a detecting member.
Figure 5:
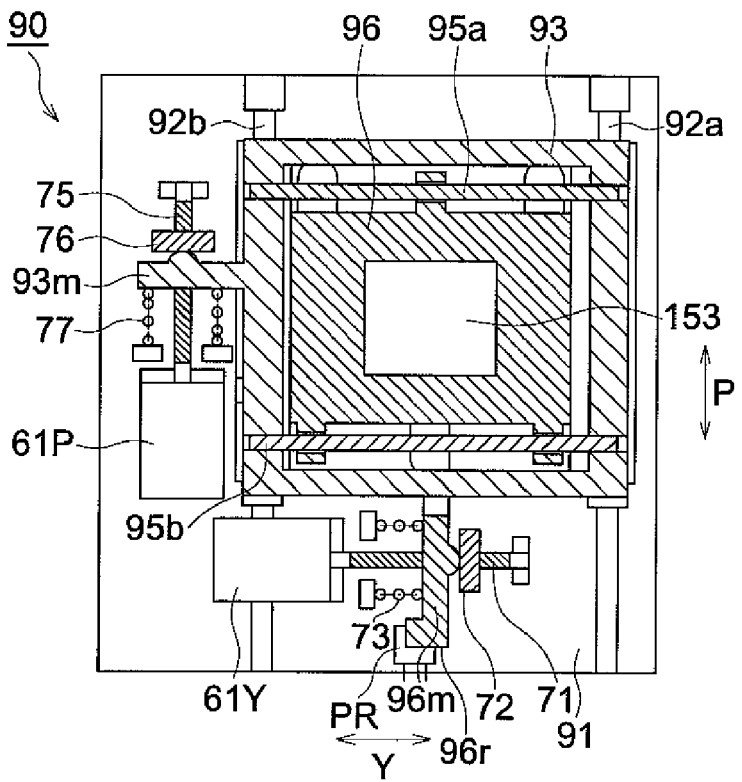

Namely, the camera shake corrector 90 relating to the present embodiment has only one photo-interrupter PI representing a detecting member having a light emitting and receiving section of a photo-interrupter, as is shown in FIG. 5(*a*) and shading section 96*s* representing a detected portion to be inserted in or dismounted from a light emitting and receiving section of the photo-interrupter PI is formed only on the first moving member 96.

In the meantime, in the present embodiment, there will be explained one wherein a photo-interrupter is used as a detecting member, and a shading section that shades light emitting and receiving section is used as a detected portion, to which, however, the invention is not limited, and an embodiment wherein photo-reflector PR is used as a detecting member, and reflecting section 96*r* is formed as a detected section may also be acceptable.

Figure 6:
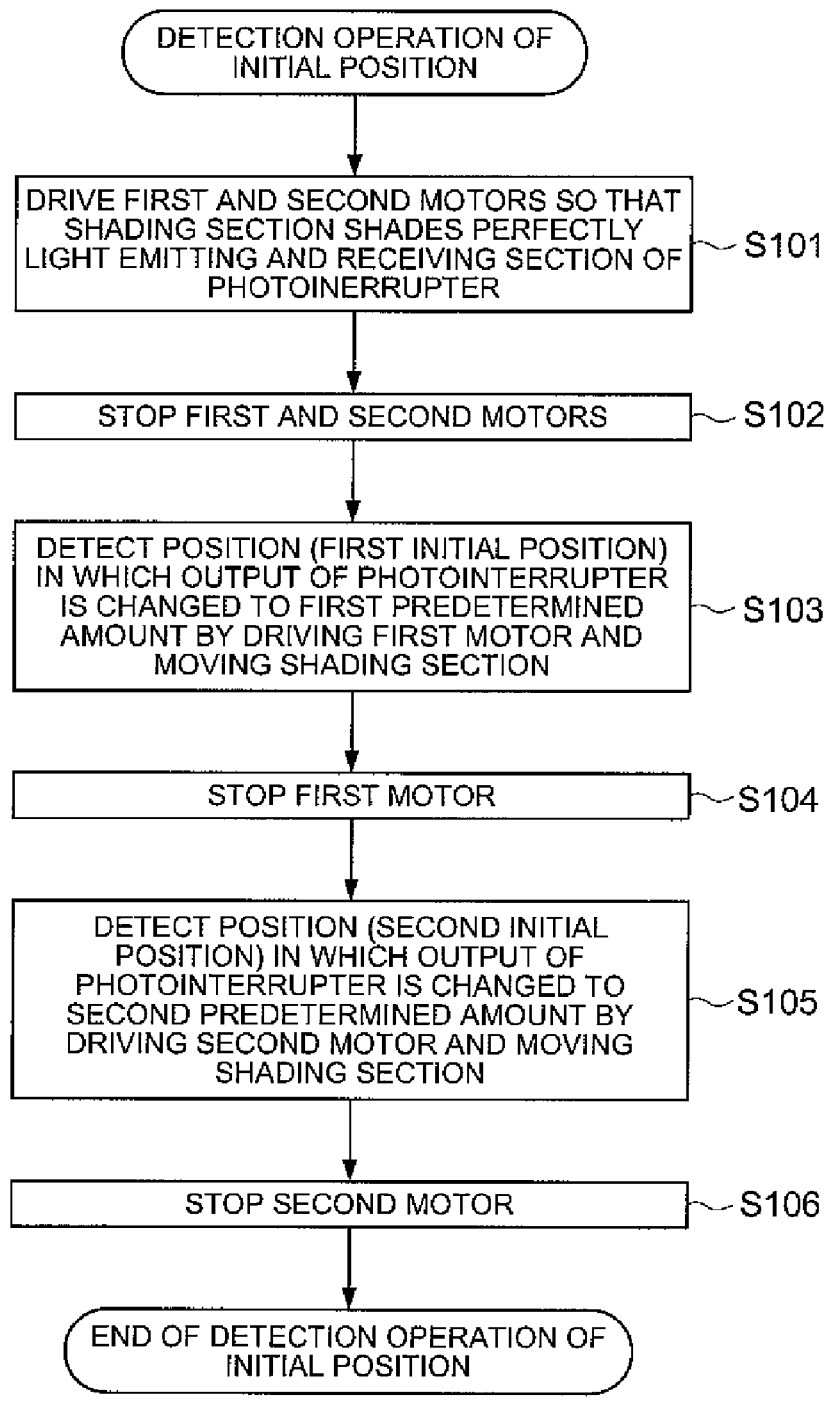
FIG. 6 is a flow chart showing schematically an example of initial position detecting operations for the first moving member and the second moving member using a shading section and a photo-interrupter, in a camera shake corrector relating to the embodiment of the invention.
Figure 7:
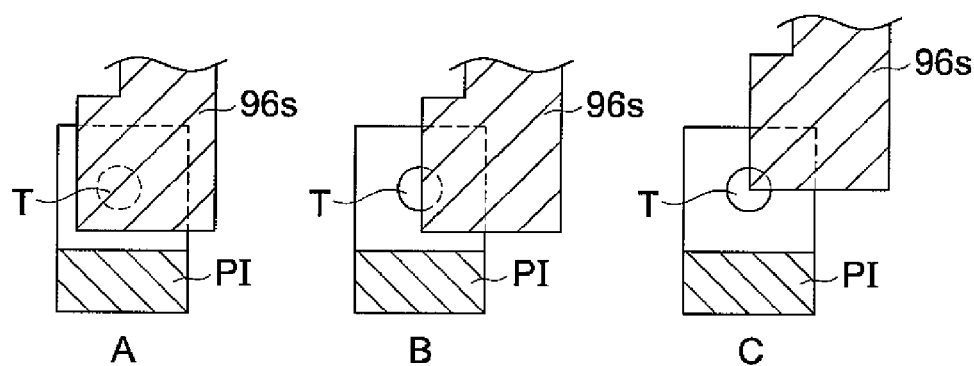
FIG. 7(a) and FIG. 7(b) are diagrams showing positional relationship between a shading section and a light emitting and receiving section of a photo-interrupter and showing output of photo-interrupter.
Figure 7:
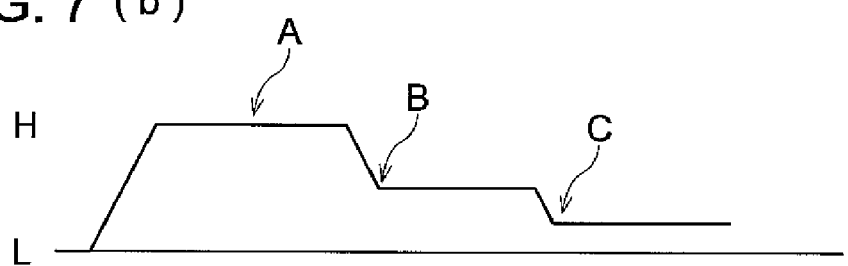

FIG. 6 is a flow chart showing schematically an example of initial position detecting operations for the first moving member and the second moving member. FIG. 7(*a*) and FIG. 7(*b*) are diagrams showing positional relationship between a shading section and a light emitting and receiving section of a photo-interrupter and showing output of photo-interrupter. FIG. 7(*a*) is a diagram showing positional relationship between the shading section and a light emitting and receiving section of a photo-interrupter, and FIG. 7(*b*) is a diagram showing output of a photo-interrupter. An example of schematic operations will be explained as follows, referring to FIG. 6 and FIGS. 7(*a*) and 7(*b*). The initial position means a reference position for control.

In the flow shown in FIG. 6, the first motor and the second motor are driven first so that the shading section may shade light emitting and receiving section T of photo-interrupter PI perfectly, (step S101). In this case, as shown by A in FIG. 7(*a*), the shading section 96*s* shades light emitting and receiving section T of photo-interrupter PI, and output of photo-interrupter PI is enhanced to the state of High (H) as shown by A in FIG. 7(*b*). Under this state, the first and the second motors are stopped (step S102).

Next, the first motor is driven, and the shading section is moved to detect the position where an output of photo-interrupter becomes the first prescribed amount (step S103). In the present example, an explanation is given under the condition that the first prescribed amount is about a half of the value that is a value when an output of photo-interrupter PI is at the state of High (H). In this case, as shown by B in FIG. 7(*a*), the first motor 61Y is driven to move the first moving member, and thereby, the shading section 96*s* is moved in the direction toward the illustrated right side, resulting in the state wherein about a half of emitting and receiving section T of photo-interrupter PI is shaded. Namely, an output of the photo-interrupter PI becomes about a half of the output in the state of High that is the first prescribed amount, as is shown by B in FIG. 7(*b*). Under the condition of this state, the first motor is stopped (step S104).

Then, the second motor is driven, and the shading section is moved to detect the position where an output of photo-interrupter becomes the second prescribed amount (step S105). In the present example, an explanation is given under the condition that the second prescribed amount is about a quarter of the value that is a value when an output of photo-interrupter PI is at the state of High (H). In this case, as shown by C in FIG. 7(*a*), the second motor 61P is driven to move the second moving member, and thereby, the shading section 96*s* is moved in the illustrated upward direction, resulting in the state wherein about a quarter of emitting and receiving section T of photo-interrupter PI is shaded. Namely, an output of the photo-interrupter PI becomes about a quarter of the output in the state of High (H) that is the first prescribed amount, as is shown by C in FIG. 7(*b*). Under the condition of this state, the second motor is stopped (step S106).

Through the aforesaid steps, initial position detecting operations for the first moving member and the second moving member are terminated, and the first moving member and the second moving member go into the state where they are set to their initial positions. Namely, it is possible to detect initial positions of two members of the first moving member and the second moving member, by photo-interrupter PI representing the one and only detecting member and by a shaded section that is a section to be detected formed on the first moving member, and to stop them.

Figure 8:
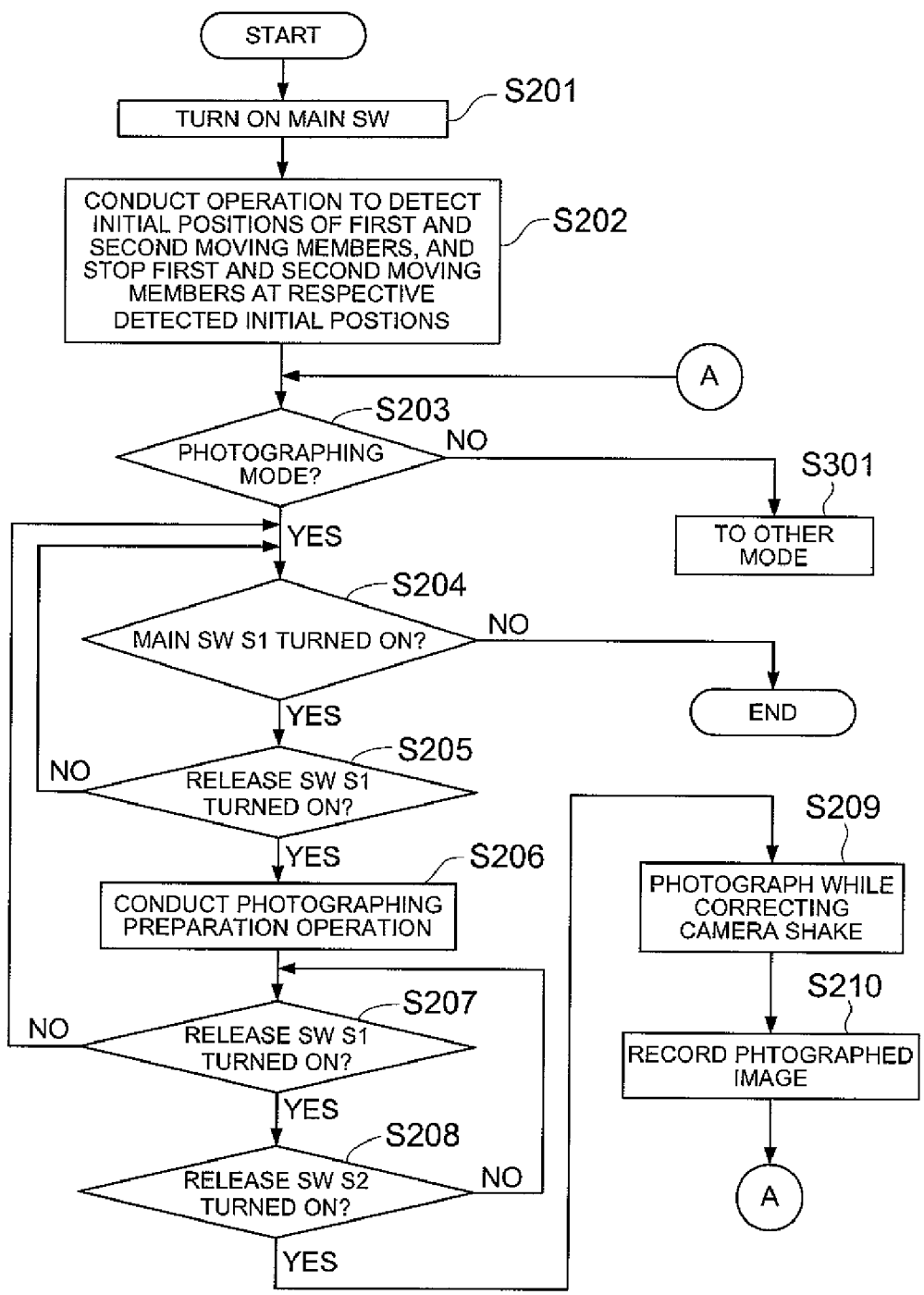
FIG. 8 is a flow chart showing schematic operations in the case of "photographing mode" of a digital camera representing an example of a photographic apparatus relating to the present embodiment.

FIG. 8 is a flow chart showing schematic operations in the case of "photographing mode" of a digital camera representing an example of a photographic apparatus relating to the present embodiment. An explanation will be given as follows, referring to the flow.

In the flow shown in FIG. 8, when a main switch is turned on first (step S201), initial position detecting operations to detect initial positions for the first moving member and the second moving member are conducted, and the first moving member and the second moving member are stopped at their initial positions (step S202). In this step S202, operations explained in FIG. 6 and FIGS. 7(*a*)-7(*b*), or operations which will be explained later in FIG. 11 and FIGS. 12(*a*)-12(*b*) are carried out.

Then, a mode is judged whether it is a photographing mode or not (step S203). When the mode is not established to the photographing mode (S203; No), the flow moves to the other established mode (step S301). When the mode is established to the photographing mode (S203; Yes), the main switch is judged again whether it is turned on or not (step S204). When the main switch is operated to be OFF (step S204; No), the flow is terminated.

When the main switch is operated to be ON (step S204; Yes), the flow waits until release switch S1 is turned on (step S205). When the release switch S1 is turned on (step S205; Yes), preparatory photographing operations are carried out (step S206). The preparatory photographing operations mean AF operations representing focusing operations and photometric operations for determining exposure conditions.

After the preparatory photographing operations are terminated, the release switch 31 is confirmed again whether it is turned on or not (step S207). When the release switch S1 is not turned on (step S207; No), the flow returns to step S204.

When the release switch S1 is turned on (step S207; Yes), the flow waits until release switch S2 is turned on (step S208).

After the release switch S2 is turned on (step S208; Yes), photographing is carried out while conducting camera shake correction (step S209). Then, images taken are recorded (step S210), and the flow returns to step S203.

The foregoing represents schematic operations in the case of "photographing mode" of a digital camera that is an example of a photographic apparatus relating to the present invention.

Figure 9:
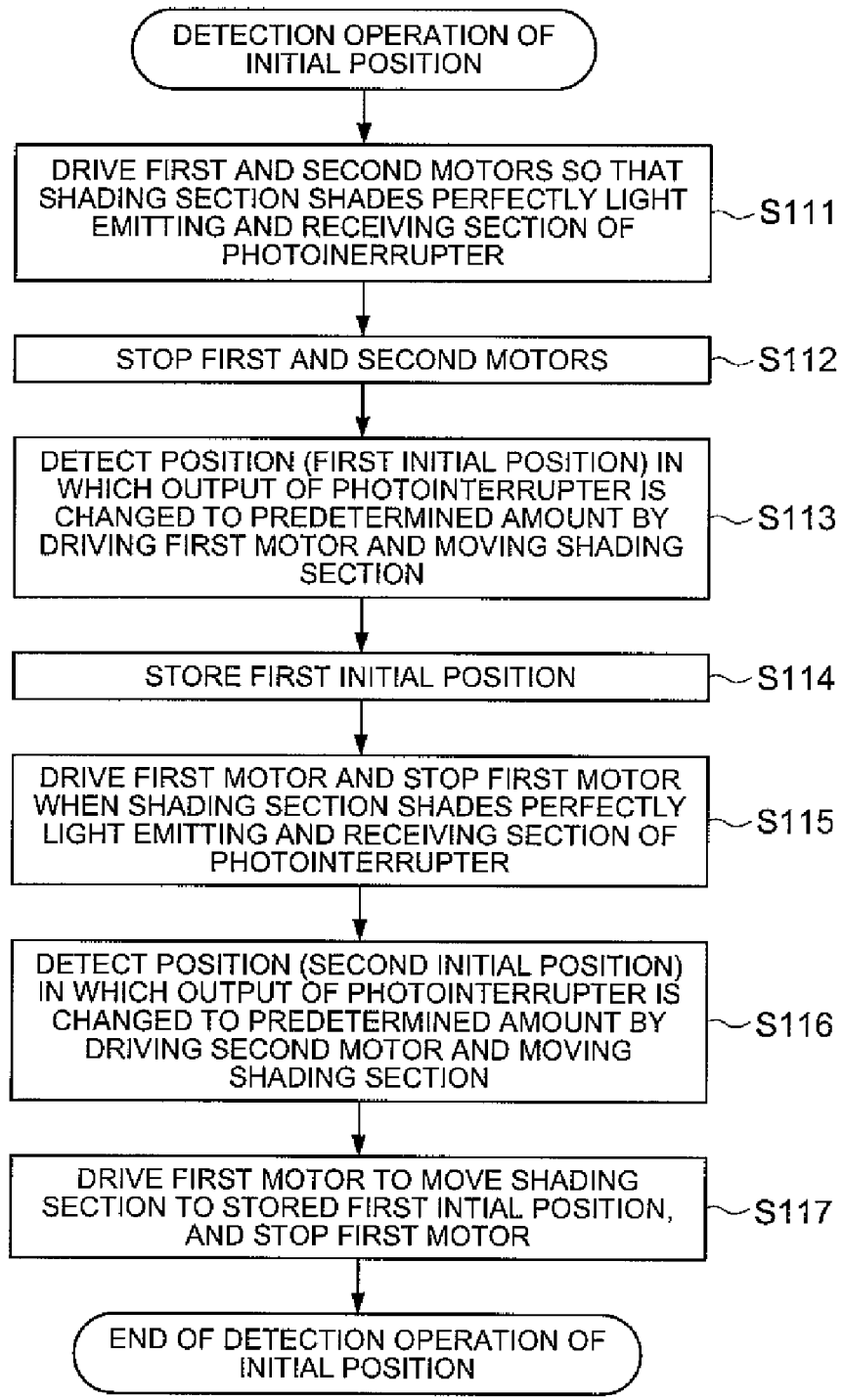
FIG. 9 is a flow chart showing other examples of operations to detect initial positions of the first and second moving members in a camera shake corrector relating to the present embodiment.
Figure 10:
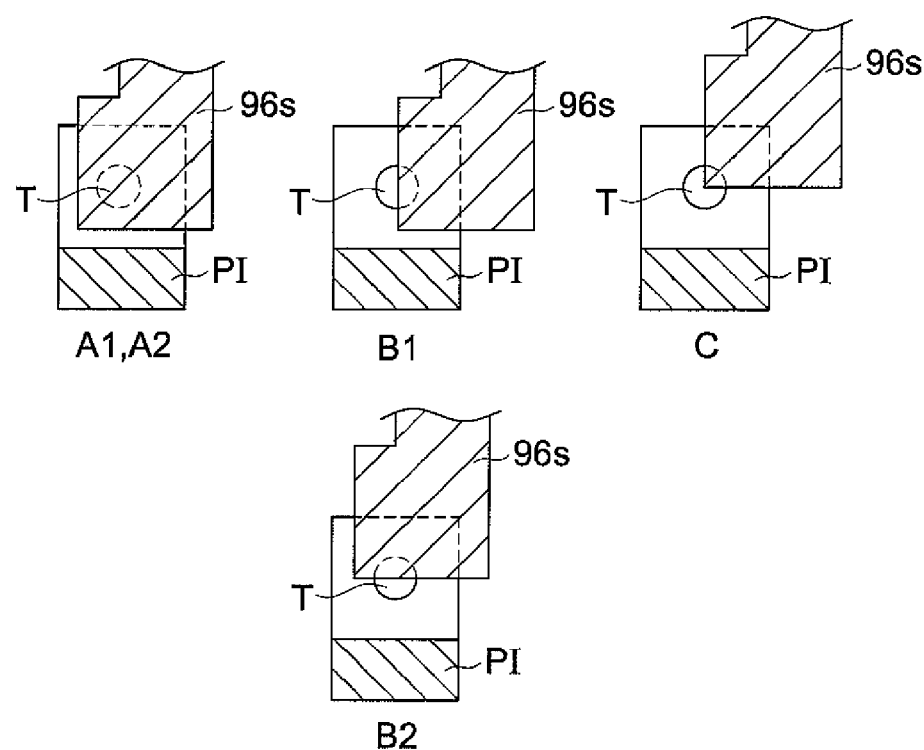
FIG. 10(a) and FIG. 10(b) are diagrams showing positional relationship between a shading section and a light emitting and receiving section of a photo-interrupter and showing output of photo-interrupter.
Figure 10:
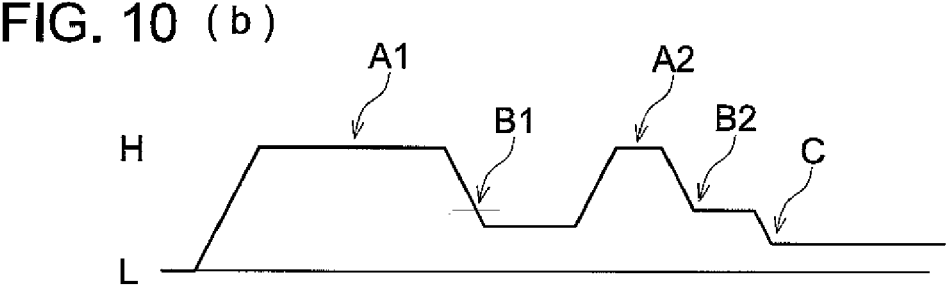

FIG. 9 is a flow chart showing other examples of operations to detect initial positions of the first and second moving members in a camera shake corrector relating to the present embodiment. FIG. 10(a) and FIG. 10(b) are diagrams showing positional relationship between a shading section and light emitting and receiving section T of a photo-interrupter and showing output of photo-interrupter. FIG. 10(a) is a diagram showing positional relationship between a shading section and a light emitting and receiving section of a photo-interrupter, and FIG. 10(b) is a diagram showing an output of photo-interrupter. An example of the schematic operations will be explained as follows, referring to FIG. 9 and FIGS. 10(a)-10(b).

In the flow shown in FIG. 9, the first motor and the second motor are driven so that light emitting and receiving section T of a photo-interrupter may be shaded perfectly by the shading section (step S111). In this case, shading section 96s goes into a state to shade perfectly light emitting and receiving section T of photo-interrupter PI, as shown by A1 in FIG. 10(a), and an output of photo-interrupter PI goes into a state of High (H) as shown by A1 in FIG. 10(b). Under the condition of this state, the first motor and the second motor are stopped (step S112).

Then, the first motor is driven to move the shading section, and a position where an output of a photo-interrupter becomes a prescribed amount is detected (step S113). In the present example, an explanation is given under the condition that the prescribed amount is about a half of the value that is a value when an output of photo-interrupter PT is at the state of High (H). In this case, as is shown by B1 in FIG. 10(a), first motor 61Y is driven to move the first moving member, and shading section 96s is moved in the direction of illustrated right side, resulting in the state wherein about a half of light emitting and receiving section T of photo-interrupter PI is shaded. Namely, as shown by B1 in FIG. 10(b), a position where an output of photo-interrupter PI comes to about a half of that under the state of High (H) that is a prescribed amount, is detected, and it is stored as a first initial position (step S114). Specifically, an excitation pattern of the first motor in the occasion when an output of photo-interrupter PI comes to about a half of that under the state of High (H) is stored.

Then, the first motor is driven to regain the state where the shading section shades the light emitting and receiving section T of photo-interrupter PI perfectly again, and then, the first motor is stopped (step S115). In this case, the shading section 96s shades the light emitting and receiving section T of photo-interrupter PI perfectly as is shown by A2 in FIG. 10(a), resulting in the state wherein an output of photo-interrupter PT comes to High (H), as is shown by A2 in FIG. 10(b).

Then, the second motor is driven to move the shading section so that a position where an output of the photo-interrupter comes to a prescribed amount may be detected, and then, the second motor is stopped (step S116). In this case, the second motor 61P is driven to move the second moving member, and the shading section 96s is moved in the upward direction in the illustration as is shown by B2 in FIG. 10(a), resulting in the state where about a half of the light emitting and receiving section T of photo-interrupter PI is shaded. Namely, an output of the photo-interrupter PI comes to about a half of that in the state of High (H) as is shown by B2 in FIG. 10(b).

Then, the first motor is driven to regain an excitation pattern position of the first initial position that is stored when it is in the step S114 (step S117).

The aforesaid way also makes it possible to detect initial positions of two members including the first moving member and the second moving member by photo-interrupter PI representing the single detecting member and by a shading section that is formed on the first moving member and is a section to be detected, to stop the moving members.

Figure 11:
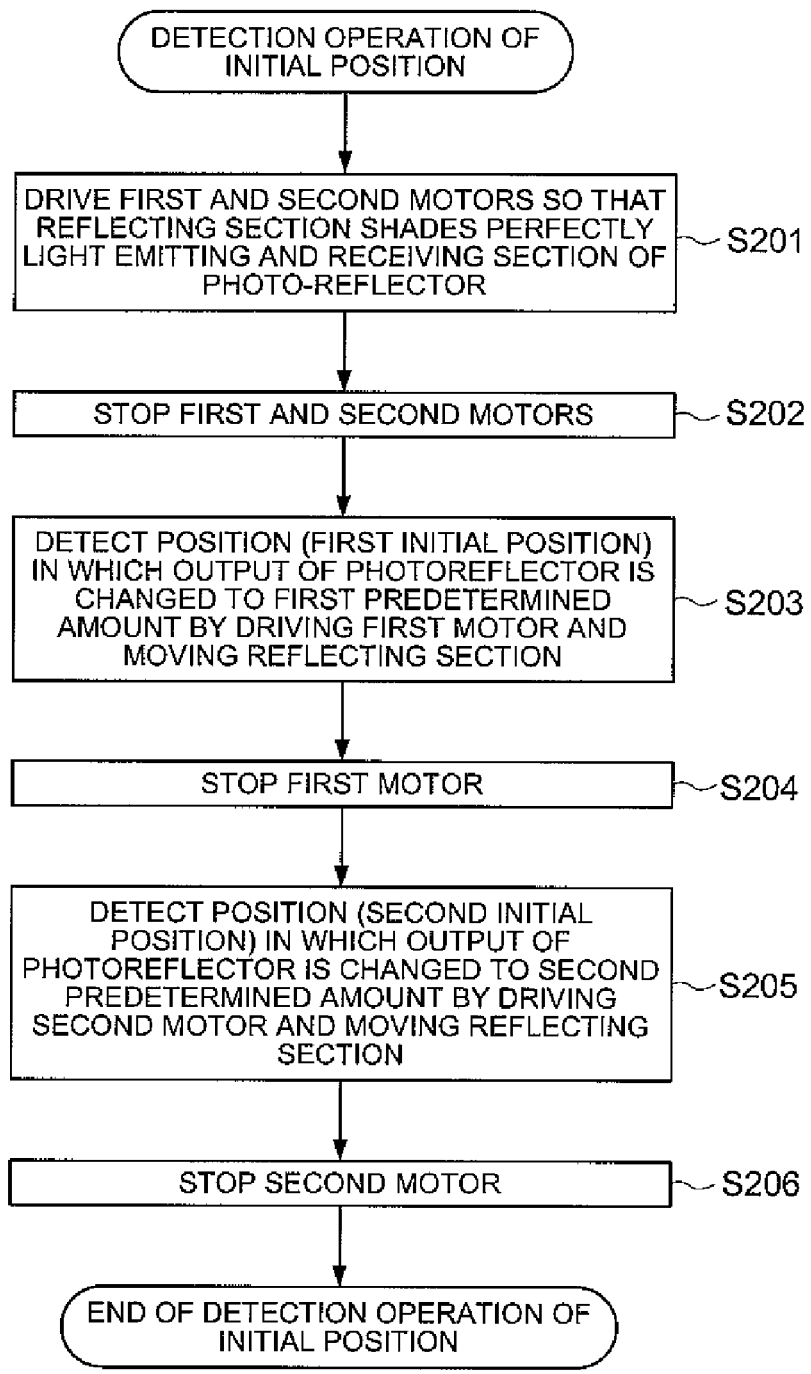
FIG. 11 is a flow chart showing an outline of an example of operations to detect initial positions of the first and second moving members each employing a photo-reflector and a reflecting section, in a camera shake corrector relating to the present embodiment.
Figure 12:
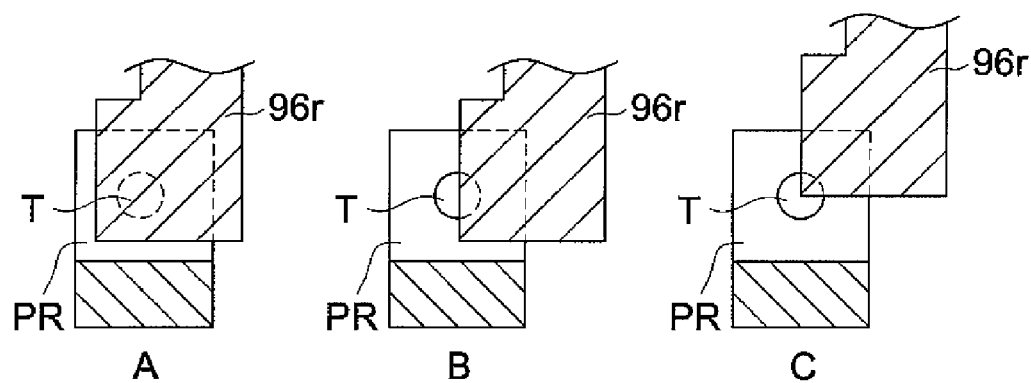
FIG. 12(a) and FIG. 12(b) are diagrams showing positional relationship between a reflecting section and a photo-reflector and showing output of the photo-reflector.
Figure 12:
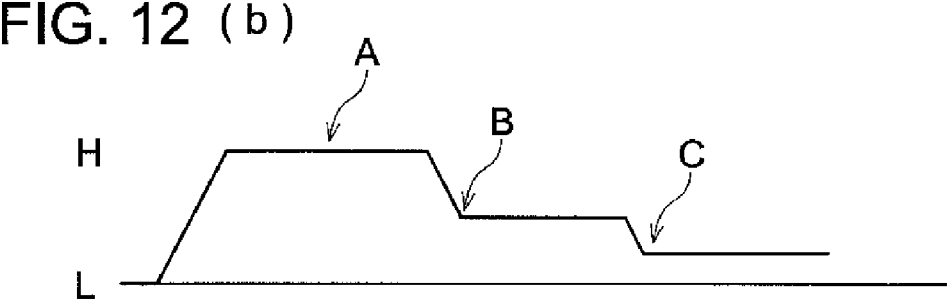

FIG. 11 is a flow chart showing an outline of an example of initial position detecting operations of the first and second moving members in a camera shake corrector relating to the present embodiment. FIGS. 12(a)-12(b) are diagrams showing positional relationship between a reflecting section and a light emitting and receiving section of a photo-reflector and showing an output of a photo-reflector. FIG. 12(a) is a diagram showing positional relationship between a reflecting section and a light emitting and receiving section for the photo-reflector, and FIG. 12(b) is a diagram showing an output of a photo-reflector. An example of an outline of operations will be explained as follows, referring to FIG. 6 and FIGS. 12(a)-12(b).

In the flow shown in FIG. 11, the first motor and the second motor are driven so that the reflecting section may be reflected on the complete light emitting and receiving section of photo-reflector PR (step S201). In this case, reflecting section 96r results in the state wherein it is reflected on the complete light emitting and receiving section T of photo-reflector PR as shown by A of FIG. 12(a), and an output of photo-reflector PR results in the state of High (H) as shown by A in FIG. 12(b). Under the condition of this state, the first motor and the second motor are stopped (step S202).

Then, the first motor is driven to move the reflecting section, and a position where an output of a photo-reflector PR becomes the first prescribed amount is detected (step S203). In the present example, an explanation is given under the condition that the prescribed amount is about a half of the value that is a value when an output of photo-reflector PI is at the state of High (H). In this case, as is shown by B in FIG. 12(a), first motor 61Y is driven to move the first moving member, and reflecting section 96r is moved in the direction of illustrated right side, resulting in the state wherein the reflecting section 96r is reflected on about a half of light emitting and receiving section T of photo-reflector PR. Namely, as shown by B in FIG. 12(b), an output of photo-reflector PR comes to about a half of that in the state of High (H) that is the first prescribed amount. Under the condition of this state, the first motor is stopped (step S204).

Then, the second motor is driven to move the reflecting section, and a position where an output of a photo-reflector becomes the second prescribed amount is detected (step S205). In the present example, an explanation is given under the condition that the second prescribed amount is about a quarter of the value that is a value when an output of photo-reflector PR is at the state of High (H). In this case, as is shown by C in FIG. 12(a), second motor 61P is driven to move the second moving member, and reflecting section 96r is moved in the upward direction in illustration, resulting in the state wherein the reflecting section 96r is reflected on about a quarter of light emitting and receiving section T of photo-reflector PR. Namely, as shown by C in FIG. 12(b), an output of photo-reflector PR comes to about a quarter of that in the state of High (H) that is the first prescribed amount. Under the condition of this state, the second motor is stopped (step S206).

Through the aforesaid process, initial position detecting operations for the first and second moving members are terminated, and the first moving member and the second moving member come into the state wherein they are set to their initial positions. Namely, it is possible to detect initial positions for two members including the first moving member and the second moving member to stop them by photo-reflector PR which is the only detecting member and by the reflecting section which is a section to be detected formed on the first moving member.

Figure 13:
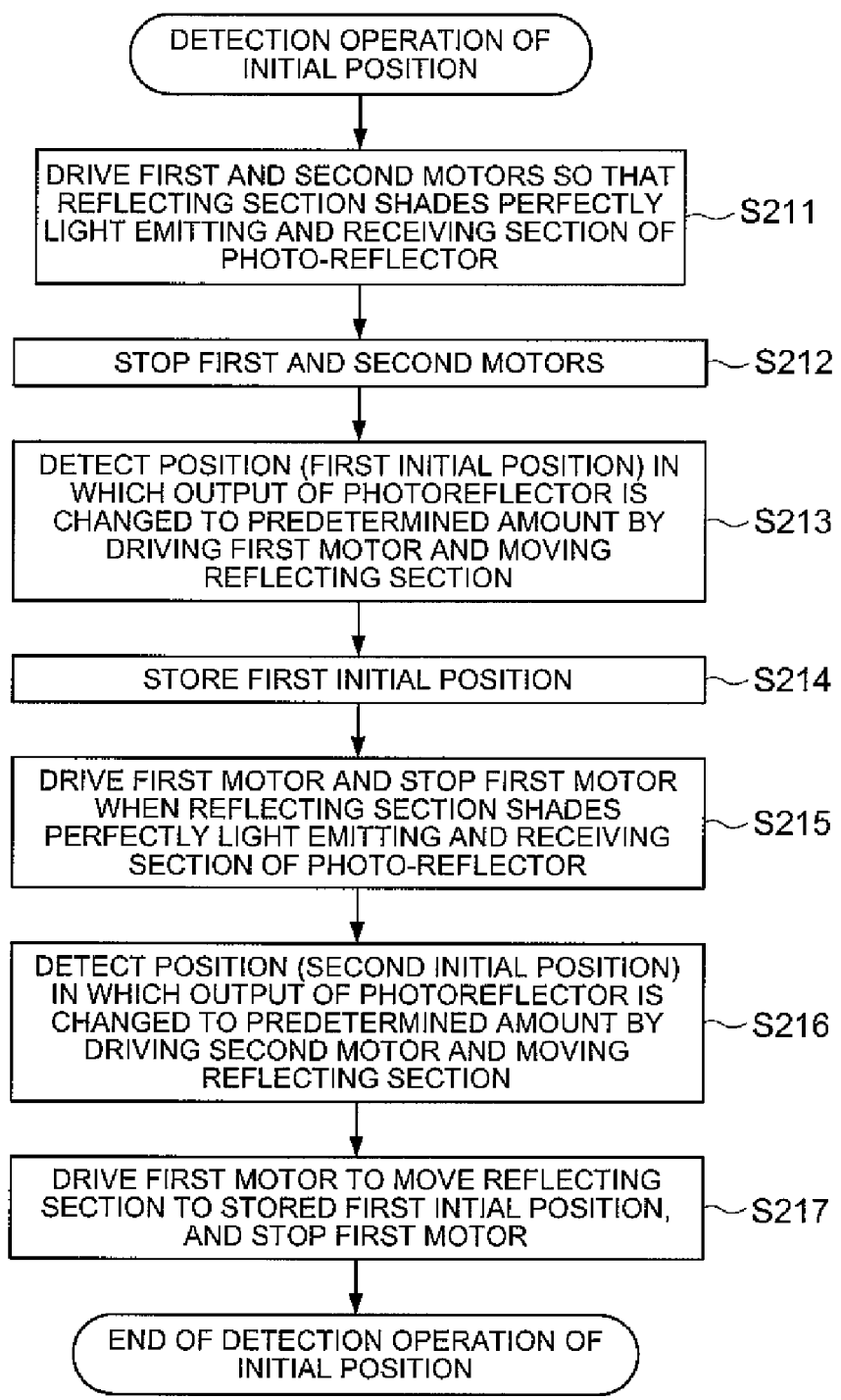
FIG. 13 is a flow chart showing an outline of another example of operations to detect initial positions of the first and second moving members each employing a photo-reflector and a reflecting section, in a camera shake corrector relating to the present embodiment.
Figure 14:
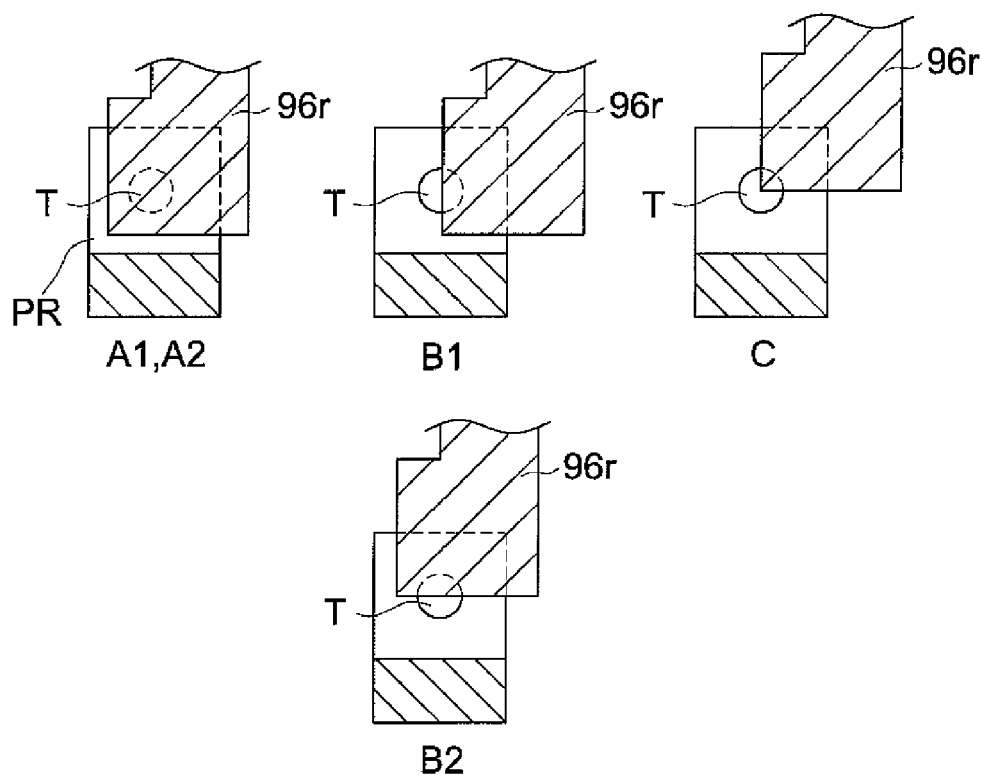
FIG. 14(a) and FIG. 14(b) are diagrams showing positional relationship between a reflecting section and a photo-reflector and showing output of the photo-reflector.
Figure 14:
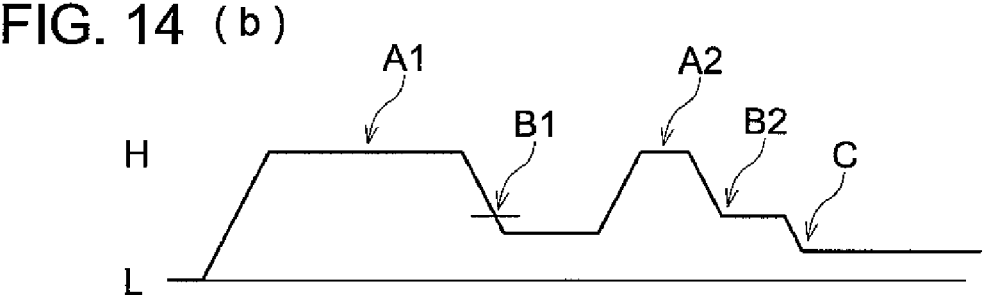

FIG. 13 is a flow chart showing other examples of initial position detecting operations for the first and second moving members in a camera shake corrector relating to the present embodiment. FIGS. 14(a)-14(b) are diagrams showing positional relationship between a reflecting section and a light emitting and receiving section of a photo-reflector and showing an output of a photo-reflector. FIG. 14(a) is a diagram showing positional relationship between a reflecting section and a light emitting and receiving section for the photo-reflector, and FIG. 14(b) is a diagram showing an output of a photo-reflector. An example of an outline of operations will be explained as follows, referring to FIG. 13 and FIGS. 14(a)-14(b).

In the flow shown in FIG. 13, the first motor and the second motor are driven first so that reflecting section 96r may be reflected perfectly on the complete light emitting and receiving section T of photo-reflector PR (step S211). In this case, reflecting section 96r results in the state wherein it is reflected perfectly on the complete light emitting and receiving section T of photo-reflector PR as shown by A1 in FIG. 14(a), and an output of photo-reflector PR results in the state of High (H) as shown by A1 in FIG. 14(b). Under the condition of this state, the first motor and the second motor are stopped (step S212).

Then, the first motor is driven to move the reflecting section 96r, and a position where an output of a photo-reflector becomes a prescribed amount is detected (step S213). In the present example, an explanation is given under the condition that the prescribed amount is about a half of the value that is a value when an output of photo-reflector PR is at the state of High (H). In this case, as is shown by B1 in FIG. 14(a), first motor 61Y is driven to move the first moving member, and reflecting section 96r is moved in the direction of illustrated right side, resulting in the state wherein the reflecting section 96r is reflected on about a half of light emitting and receiving section T of photo-reflector PR. Namely, as shown by B1 in FIG. 14(b), a position where an output of photo-reflector PR comes to about a half of that under the state of High (H) that is a prescribed amount, is detected, and it is stored as a first initial position (step S214). Specifically, an excitation pattern of the first motor in the occasion when an output of photo-reflector PR comes to about a half of that under the state of High (H) is stored.

Then, the first motor is driven to regain the state where the reflecting section 96r is reflected perfectly on the complete light emitting and receiving section T of photo-reflector PR again, and then, the first motor is stopped (step S215). In this case, the reflecting section 96r is reflected on the complete light emitting and receiving section T of photo-reflector PR as is shown by A2 in FIG. 14(a), resulting in the state wherein an output of photo-reflector PR comes to High (H), as is shown by A2 in FIG. 14(b).

Then, the second motor is driven to move the reflecting section 96r so that a position where an output of the photo-reflector comes to a prescribed amount may be detected, and then, the second motor is stopped (step S216). In this case, the second motor 61P is driven to move the second moving member, and the reflecting section 96r is moved in the upward direction in the illustration as is shown by B2 in FIG. 14(a), resulting in the state wherein the reflecting section 96r is reflected on about a half of the light emitting and receiving section T of photo-reflector PR. Namely, an output of the photo-reflector PR comes to about a half of that in the state of High (H) as is shown by B2 in FIG. 14(b).

Then, the first motor is driven to regain an excitation pattern position of the first initial position that is stored when it is in the step S214 (step 217).

The aforesaid way also makes it possible to detect initial positions of two members including the first moving member and the second moving member by photo-reflector PR representing the single detecting member and by a reflecting section that is formed on the first moving member and is a section to be detected, to stop them.

Incidentally, in the aforesaid embodiment, the explanation has been given, referring to the example wherein initial position detecting operations were conducted when the main switch was turned on. However, the invention is not limited to this, and it is also possible to constitute so that initial position detecting operations are conducted when switch S1 is turned on, when zooming is carried out, or when photographing is terminated.

As explained above, the present embodiment makes is possible to detect initial positions of two members including the first moving member and the second moving member to stop them only by photo-interrupter PI representing the single detecting member and by a shading section that is formed on the first moving member and is a section to be detected, or only by photo-reflector PR representing the single detecting member and by a reflecting section representing a section to be detected formed on the first moving member. Thus, downsizing of the camera shake corrector, and a low cost caused by reduction of detecting members can be realized, and a lens barrel having a camera shake correcting function that is more smaller in size and is more lower in cost as well as a photographing apparatus equipped therewith can be obtained.

The present embodiment makes it possible to obtain a small-sized camera shake corrector and to obtain a small-sized photographing apparatus equipped with a lens barrel having a camera shake correcting function.

What is claimed is:

1. A camera shake corrector comprising:
   (a) a first moving member that holds an image sensor or a prescribed lens and is capable of moving in a first direction;
   (b) a first motor that moves the first moving member;
   (c) a second moving member that holds the first moving member and is capable of moving in a second direction that is different from the first direction;
   (d) a second motor that moves a second moving member;
   (e) a single detecting member; and
   (f) a section to be detected by the single detecting member, which is formed on the first moving member,
   wherein a first initial position of the first moving member is detected by moving the first moving motor, in which an output of the single detecting member becomes a first prescribed amount, and a second initial position of the second moving member is detected by moving the second moving motor, in which the output of the single detecting member becomes a second prescribed amount.

2. The camera shake corrector of claim 1, wherein the detecting member is a light emitting and receiving section, and the section to be detected is a shading section.

3. The camera shake corrector of claim 1, wherein the detecting member is a light emitting and receiving section, and the section to be detected is a reflecting section.

4. A lens barrel comprising the camera shake corrector described in claim 1.

5. A photographic apparatus comprising the lens-barrel described in claim 4.

* * * * *